US010390416B2

(12) United States Patent
Ejiri et al.

(10) Patent No.: US 10,390,416 B2
(45) Date of Patent: Aug. 20, 2019

(54) DC DISTRIBUTION CONNECTION DEVICE

(71) Applicant: SMK Corporation, Tokyo (JP)

(72) Inventors: Koichiro Ejiri, Kanagawa (JP); Haruhiko Kondo, Kanagawa (JP)

(73) Assignee: SMK Corporation, Tokyo (JP)

( * ) Notice: Subject to any disclaimer, the term of this patent is extended or adjusted under 35 U.S.C. 154(b) by 162 days.

(21) Appl. No.: 15/630,968

(22) Filed: Jun. 23, 2017

(65) Prior Publication Data

US 2018/0103530 A1 Apr. 12, 2018

(30) Foreign Application Priority Data

Oct. 11, 2016 (JP) ................................ 2016-199792

(51) Int. Cl.

| | |
|---|---|
| ***H05B 41/288*** | (2006.01) |
| ***H01J 27/02*** | (2006.01) |
| ***H02H 7/127*** | (2006.01) |
| ***H02J 1/10*** | (2006.01) |
| ***H02J 13/00*** | (2006.01) |
| ***H04M 19/00*** | (2006.01) |
| ***H01R 13/62*** | (2006.01) |
| ***H01R 13/635*** | (2006.01) |

(52) U.S. Cl.

CPC ........ *H05B 41/2882* (2013.01); *H01J 27/022* (2013.01); *H01R 13/6205* (2013.01); *H01R 13/635* (2013.01); *H02H 7/127* (2013.01); *H02J 1/10* (2013.01); *H02J 13/0003* (2013.01); *H04M 19/006* (2013.01); *Y02B 90/224* (2013.01); *Y02B 90/228* (2013.01); *Y04S 20/14* (2013.01); *Y04S 20/18* (2013.01)

(58) Field of Classification Search

None

See application file for complete search history.

(56) References Cited

U.S. PATENT DOCUMENTS

2014/0099808 A1* 4/2014 McClelland ....... H01R 13/6205 439/153

FOREIGN PATENT DOCUMENTS

JP 3335026 B2 8/1996

OTHER PUBLICATIONS

JP3335026 English Translation (Year: 1996).*

* cited by examiner

*Primary Examiner* — Douglas X Rodriguez

(57) ABSTRACT

The respective proportionality constants of magnetic force by magnetic field producing portion for biasing the plug in the direction of insertion and resilient force by a spring mechanism for biasing the plug in the direction of extraction are adjusted in such a manner that the resilient force is greater than the magnetic force until the plug pin reaches an intermediate insertion position at which the plug pin comes into proximity to or separates from the socket contact, whereas the magnetic force is greater than the resilient force at a position at which the plug pin is inserted into a complete insertion position for a hot-line connection to the socket contact. The plug pin in the vicinity of the intermediate insertion position, at which there is a possibility of occurrence of an arc discharge, is ejected by the resilient force.

5 Claims, 5 Drawing Sheets

DC DISTRIBUTION CONNECTION DEVICE

CROSS REFERENCE TO RELATED APPLICATION

The contents of the following Japanese patent application are incorporated herein by reference, Japanese Patent Application No. 2016-199792 filed on Oct. 11, 2016.

FIELD

The present invention relates to a DC distribution connection device for preventing an arc discharge that may occur at the instant when a plug pin and a socket contact making a hot-line connection to each other come into proximity to or separate from each other.

BACKGROUND

A terminal, such as of power lines for transmission of high-voltage and high-current electric power, may be connected to a socket, and plug pins of a plug may make a hot-line connection to socket contacts of the socket so as to supply power source to an electrical device connected to the plug. In this case, at the moment at which the plug pins come into proximity to or separate from the socket contacts, there will be accumulated high electric energy between the plug pins and the socket contacts being brought into close proximity to each other, causing an arc discharge to occur therebetween. Such an arc discharge may also occur by an induced electromotive force that is produced when the plug pins connected to an inductive load is pulled out of the socket contacts of the socket connected to the power lines.

The arc discharge may readily occur at the instant when the plug pins of the plug come into proximity to or separate from the socket contacts in the process of insertion or extraction thereof. When the insertion or extraction force on the plug is released at such a position at which the plug pins and the socket contacts are in close proximity to each other, arc discharges may continuously occur, causing the plug and the socket to be heated and thus leading a danger of occurrence of fire.

The DC distribution connection device disclosed in Patent Literature 1 is configured such that the confronting surfaces of a plug and a socket, which face each other in the direction of insertion and extraction of the plug, are provided with a set of magnets and magnetic plates attracted by the magnets, which face each other, respectively, so that the plug pins and the socket contacts are attracted to each other at the connection position of the plug and the socket where the plug pins and the socket contacts make a hot-line connection to each other. According to the conventional DC distribution connection device, even when the insertion or extraction force is released at the intermediate insertion position of the plug pins at which the plug pins are in close proximity to the socket contacts, the plug is attracted toward the socket by the magnetic force by which the magnets attract the magnetic plates. This prevents the plug pins from stopping at such a position at which arc discharges continuously occur.

CITATION LIST

Patent Literature

Patent Literature 1: Japanese Patent No. 3335026

SUMMARY

Technical Problem

However, the DC distribution connection device of Patent Literature 1 is configured such that when a cable connected to the plug is unexpectedly pulled while the plug and the socket are in connection to each other, the plug attracted by the magnetic force is disconnected from the socket before the cable is broken so as to prevent the break of the cable. To this end, the set of magnets and magnetic plates allow the plug and the socket to be attracted to each other, and the magnetic force of the magnets for attracting the magnetic plates is set to a sufficiently low value as compared with the tension by which the cable may be broken. Thus, at the intermediate insertion position of the plug pins at which the plug pins come into proximity to or separate from the socket contacts, such a force that is enough to eject the plug by the magnetic force of the magnets cannot be always acquired. As a result, releasing the insertion or extraction force may possibly cause the plug to stop in the vicinity of the intermediate insertion position at which there is a possibility of occurrence of an arc discharge. Therefore, the problem is not essentially solved.

Furthermore, as shown in FIG. 5, in the DC distribution connection device 100 for allowing the plug and the socket to be attracted to each other by the magnetic force, a foreign matter 101 such as a dust particle may be interposed between the opposing surfaces of the plug 102 and the socket 105, which are opposed to each other in the direction of insertion and extraction. In this case, the foreign matter 101 is sandwiched by the attractive force of the two sets of magnets 103 and 104, and the plug pins 102*a* of the plug 102 stop in close proximity to the socket contacts 105*a* of the socket 105. Thus, even if the insertion or extraction force is not released, there may be a danger of continuous occurrence of arc discharges.

The present invention was developed in view of the conventional problems. It is therefore an object of the invention to provide a DC distribution connection device in which the plug pins are not stopped at a position in close proximity to the socket contacts even if a foreign matter is interposed between the plug and the socket, and which positively prevents the continuous occurrence of arc discharges.

Solution to Problem

To achieve the aforementioned purpose, a DC distribution connection device according to a first aspect includes: a plug having plug pins to be connected to a DC load; and a socket having socket contacts which are connected to a DC power supply and located in plug insertion holes that guide the plug pins so as to be freely inserted therein and extracted therefrom. The DC distribution connection device is configured such that the plug pins and the socket contacts are brought into contact with each other between an intermediate insertion position of the plug pins at which the socket contacts come into proximity thereto or separate therefrom and a complete insertion position at which the plug pins have been inserted from the intermediate insertion position in a direction of insertion, and at the complete insertion position, the plug pins make a hot-line connection to the socket contacts. The DC distribution connection device further includes: magnetic field producing portion that is formed between the plug and the socket in a direction of insertion and extraction of the plug pins and that attracts the plug by a magnetic force in a direction of insertion of the plug pins; and a spring mechanism that is disposed between the plug and the socket in the direction of insertion and extraction of the plug and that is compressed between the plug and the socket so as to generate a resilient force that allows the plug to be biased in the direction of extraction of the plug pins. The magnetic force by the magnetic field producing portion and the resilient force of the spring mechanism are adjusted so that the resilient force is greater than the magnetic force at the intermediate insertion position of the plug pins, and at the complete insertion position, the magnetic force is greater than the resilient force.

The plug pins may be located away, in the direction of extraction, from the intermediate insertion position at which the plug pins come into proximity to or separate from the socket contacts. In this case, since the resilient force of the spring mechanism for biasing the plug in the direction of extraction is greater than the magnetic force by the magnetic field producing portion, releasing insertion force on the plug causes the plug pins to be pulled out in the direction of extraction even if a foreign matter is interposed between the plug and the socket, and the plug pins do not stop at a position in close proximity to the socket contacts.

The plug pins are brought into contact with the socket contacts in a stroke between the intermediate insertion position and the complete insertion position in the direction of insertion and extraction, and the resilient force by the spring mechanism in the direction of extraction and the magnetic force by the magnetic field producing portion in the direction of insertion are equal to each other between those positions. Although releasing the insertion or extraction force on the plug causes the plug pins to be held stationary, there occurs no arc discharge because the plug pins are in contact with the socket contacts.

At the complete insertion position of the plug pins, the magnetic force of the magnetic field producing portion for attracting the plug in the direction of insertion is greater than the resilient force by the spring mechanism. Therefore, the plug pins and the socket contacts make a hot-line connection to each other, and thus the plug is not easily pulled out of the socket.

The DC distribution connection device according to a second aspect is characterized in that the magnetic field producing portion comprises a set of a permanent magnet and a magnetic substance, one and the other of which are disposed on respective confronting surfaces of the plug and the socket, the confronting surfaces opposed to each other in the direction of insertion and extraction of the plug pins, and the plug pins are inserted in the direction of insertion to define an insertion position of the plug pins, at which the plug and the socket are in contact with each other, as the complete insertion position.

The set of the permanent magnet and the magnetic substance are disposed on the respective confronting surfaces of the plug and the socket. Thus, when the plug pins are located at the complete insertion position, the set of the permanent magnet and the magnetic substance are the closest to each other, and the attractive force for attracting the plug pins in the direction of insertion is maximized.

The DC distribution connection device according to a third aspect is characterized in that the socket contacts are each a plate spring contact which is deflected in the direction of insertion by the plug pins to be inserted from the intermediate insertion position to the complete insertion position, and the magnetic force by the magnetic field producing portion and the resilient force of the spring mechanism are adjusted so that at the complete insertion position, the magnetic force is greater than the resultant of the resilient forces by the spring mechanism and the plate spring contacts in the direction of extraction.

At the complete insertion position of the plug pins, the magnetic force of the magnetic field producing portion for attracting the plug in the direction of insertion is greater than the resultant of the resilient forces of the spring mechanism and the socket contacts in the direction of extraction. Thus, the plug is not easily pulled out of the socket in the state where the plug pins and the socket contacts make a hot-line connection to each other.

The DC distribution connection device according to a fourth aspect is characterized in that the magnetic field producing portion comprises a pair of socket-side permanent magnets disposed on both sides of the plug insertion holes of the socket and a pair of plug-side magnetic substances disposed at respective opposing positions of the plug which are opposed to the pair of socket-side permanent magnets in the direction of insertion and extraction of the plug pins, and the pair of socket-side permanent magnets are polarized to polarities that form a magnetic field between the pair of permanent magnets in a region of the plug insertion holes where the socket contacts are each located.

In the region of the plug insertion holes where the socket contacts are located, the plug pins and the socket contacts are in close proximity to each other in the direction of insertion and extraction of the plug pins and there may easily occur an arc discharge therebetween. However, since the pair of socket-side permanent magnets forms a magnetic field in a direction orthogonal to the direction of the proximity, the direction of an arc is deflected by the magnetic field.

The DC distribution connection device according to a fifth aspect is characterized in that the pair of plug-side magnetic substances are plug-side permanent magnets which are polarized into magnetic poles different from the magnetic poles of the socket-side permanent magnets opposing, respectively, in the direction of insertion and extraction of the plug pins, in a normal connection attitude of the plug in which the plug pins are inserted into the plug insertion holes toward the corresponding socket contacts.

When the plug pins are inserted into the plug insertion holes in the normal connection attitude, an attractive force for attracting the plug pins in the direction of insertion acts on the plug because the set of permanent magnets opposed to each other on the opposing surface sides have different magnetic poles. On the other hand, when the plug pins are inserted into the plug insertion holes not in the normal connection attitude but in an erroneous connection attitude, the set of permanent magnets opposed to each other on the opposing surface sides have the same magnetic pole, and thus a repulsive force occurs which biases the plug pins of the plug in the direction of extraction.

According to the invention of the first aspect, since the plug pins do not stop at the insertion position in close proximity to the socket contacts even if a foreign matter is interposed between the plug and the socket, the continuous occurrence of arc discharges can be positively prevented.

Furthermore, since the plug pins are brought into contact with the socket contacts in a contact stroke between the intermediate insertion position and the complete insertion position, the plug pins and the socket contacts can be positively brought into contact with each other. Furthermore, it is possible to position the plug pins at the complete insertion position for making a hot-line connection to the socket contacts not necessarily by providing a lock mechanism but only by providing stopper portion for restricting the displacement of the plug pins in the direction of insertion at the complete insertion position.

Furthermore, even if there occurs an unexpected tension for pulling out the plug pins on a cable connected to the plug pins, the plug attracted to the socket by the magnetic force is pulled out before the cable is broken.

According to the invention of the second aspect, the attractive force between the plug and the socket is at maximum at the complete insertion position of the plug pins at which the plug pins and the socket contacts make a hot-line connection to each other, and thus the plug being connected to the socket is not easily pulled out thereof.

According to the invention of the third aspect, even when the socket contacts are each a plate spring contact of which resilient force increases in the direction of extraction as the plug pins are inserted, the magnetic force by the magnetic field producing portion is capable of attracting the plug and the socket to each other at the complete insertion position so as to hold the connection between the plug and the socket.

According to the invention of the fourth aspect, the direction of an arc is deflected by the magnetic field, thereby preventing damage to the plug pins and the socket contacts.

According to the invention of the fifth aspect, when an attempt is made to insert the plug pins into the plug insertion holes in an erroneous connection attitude, the plug-side permanent magnets and the socket-side permanent magnets, which are opposed to each other in the direction of insertion and extraction of the plug pins, have the same magnetic pole. This causes a repulsive force to occur on the plug in a direction opposite to the direction of insertion of the plug pins, thus allowing the plug pins to be inserted into the plug insertion holes only in the normal connection attitude.

DESCRIPTION OF EMBODIMENTS

Figure 1:
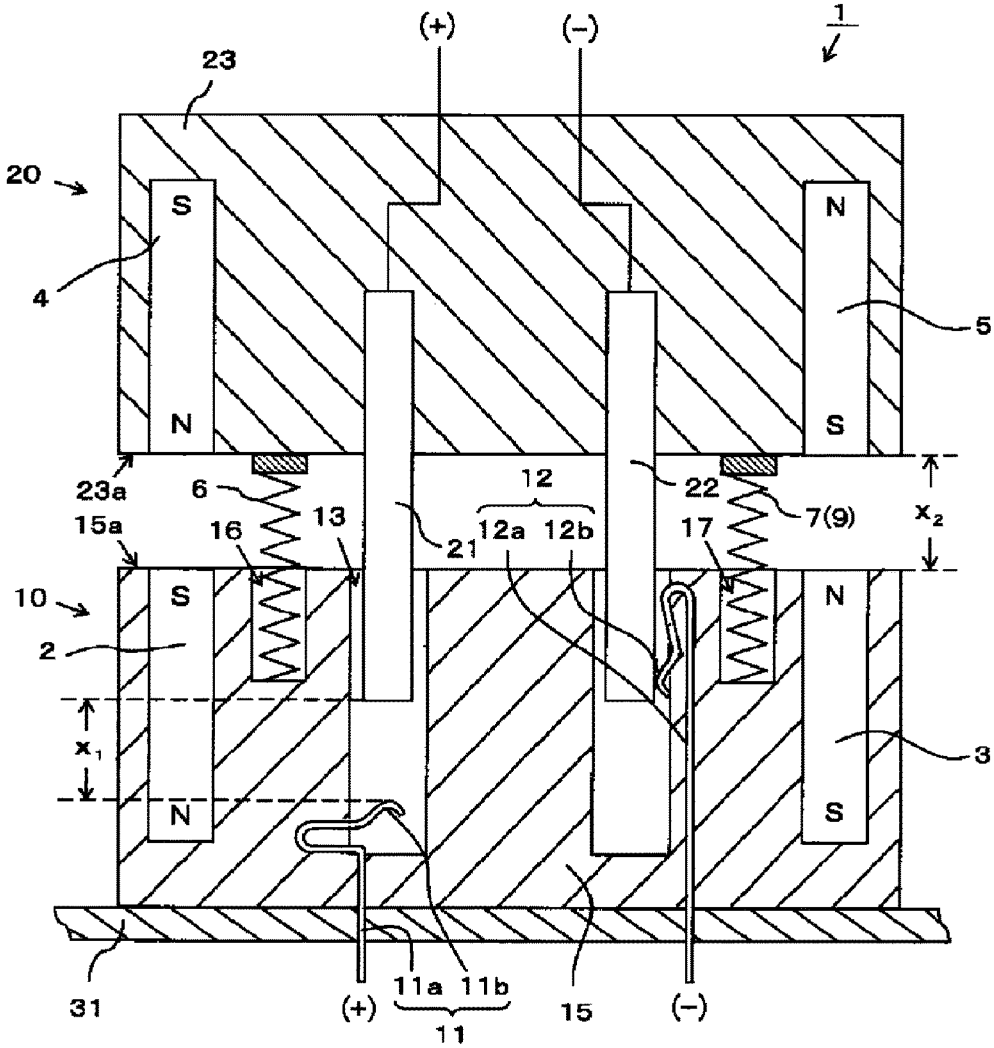
FIG. 1 is a longitudinal cross-sectional view illustrating a socket 10 and a plug 20 before being connected to the socket 10, of a DC distribution connection device 1 according to an embodiment of the present invention.

Now, with reference to FIGS. 1 to 4, a description will be made to a DC distribution connection device 1 according to an embodiment of the present invention. The DC distribution connection device 1 distributes DC power to an electrical device in a manner such that a pair of plug pins 21 and 22 of a plug 20 connected to the electrical device via a power supply cable is hot-line connected to a pair of socket contacts 11 and 12 of a socket 10 connected to a DC power supply. Each part of the connection device will be herein described, according to the directions illustrated in each of the drawings, assuming that the direction of insertion in which the plug 20 is inserted into plug insertion holes 13 and 14 of the socket 10 is defined as the downward direction, the direction of extraction in which the plug 20 is pulled out of the plug insertion holes 13 and 14 is defined as the upward direction, and the right-and-left direction illustrated is defined as the sideward direction.

The socket 10 is provided with: an insulating socket housing 15 in which a pair of a "+" side plug insertion hole 13 and a "−" side plug insertion hole 14 for insertion and extraction of a pair of plug pins 21 and 22 of the plug 20 therein and therefrom are provided to be recessed on an upper surface 15*a*; a pair of a "+" side socket contact 11 and a "−" side socket contact 12 attached to the socket housing 15; a pair of a socket-side first permanent magnet 2 and a socket-side second permanent magnet 3 that are embedded in the socket housing 15 with an upper end exposed on the upper surface 15*a*; and a pair of a first coil spring 6 and a second coil spring 7 that are protruded upwardly from a pair of blind holes 16 and 17, respectively, which are open on the upper surface 15*a*, the first and second coil springs 6 and 7 each constituting a spring mechanism.

The "+" side socket contact 11 is formed by pressing a metal plate of a copper alloy such as phosphor bronze or brass so that a leg part 11*a* and a contact part 11*b* are shaped as an elongated strip continuously in one piece. The leg part 11*a* is fixedly attached to the socket housing 15 in the vertical direction with the lower end protruded downwardly from the lower surface of the socket housing 15. On the other hand, the contact part 11*b* is bent leftward in the figure from the upper end of the leg part 11*a* in the shape of letter U so that the free end is protruded into the lower portion deep inside the "+" side plug insertion hole 13. The position of protrusion at which the contact part 11*b* of the "+" side socket contact 11 is protruded into the "+" side plug insertion hole 13 in a free state without being subjected to an external force is between an intermediate insertion position ($x=x_1$) of a "+" side plug pin 21 at which the "+" side plug pin 21 comes into proximity thereto or separates therefrom and a complete insertion position ($x=x_2$) of the "+" side plug pin 21 at which the opposed surfaces (a lower surface 23*a* and the upper surface 15*a*) of the plug 20 and the socket 10 are brought into contact with each other, with the "+" side plug pin 21 and the "+" side socket contact 11 being brought into elastic contact with each other in a contact stroke ($x_2-x_1$).

The "−" side socket contact 12 is also formed by pressing a metal plate of a copper alloy such as phosphor bronze or brass in a shape of an elongated strip. The "−" side socket contact 12 is provided with a leg part 12*a* and a contact part 12*b*. The leg part 12*a* is fixedly attached to the socket housing 15 in the vertical direction along a side of the "−" side plug insertion hole 14 and has a lower end which is protruded in a downward direction from the lower surface of the socket housing 15. The contact part 12*b* is folded downwardly in the shape of letter U at the upper end of the leg part 12*a* and has a free end which is protruded from the inner side surface at an intermediate position of the "−" side plug insertion hole 14.

The leg part 11*a* of the "+" side socket contact 11 and the leg part 12*a* of the "−" side socket contact 12 are soldered to a power supply pattern of a circuit board 31 to which the socket 10 is mounted. The leg parts 11*a* and 12*a* are connected via a DC power supply line (not shown) to the high-voltage side and the low-voltage side, respectively, of a DC power supply that outputs, for example, 96 W DC power at 48 V and 2 A.

The pair of the socket-side first permanent magnet 2 and the socket-side second permanent magnet 3 is in the shape of a vertically elongated rod. As illustrated, the socket-side first permanent magnet 2 on one side is embedded vertically in the socket housing 15 on the left of the "+" side plug insertion hole 13, in the case of which the upper end portion exposed on the upper surface 15*a* serves as the S pole, whereas the lower end portion embedded down to the left of the contact part 11*b* serves as the N pole. On the other hand, the socket-side second permanent magnet 3 on the other side is embedded vertically in the socket housing 15 on the right of the "−" side plug insertion hole 14 at a symmetric position with respect to the socket-side first permanent magnet 2 with the pair of the "+" side plug insertion hole 13 and the "−" side plug insertion hole 14 therebetween. The upper end portion exposed on the upper surface 15*a* serves as the N pole, whereas the lower end portion embedded down to the depth of the contact part 11*b* serves as the S pole. Thus, in the region where the "+" side plug pin 21 comes into proximity to or separates from the "+" side socket contact 11 at the intermediate insertion position ($x=x_1$) of the "+" side plug pin 21, a magnetic field is normally produced by magnetic force lines which are directed from the N pole of the lower end portion of the socket-side first permanent magnet 2 to the S pole of the lower end portion of the socket-side second permanent magnet 3.

The pair of the first coil spring 6 and the second coil spring 7 of which lower ends are fixedly attached to the socket housing 15 are formed of the same material in the same shape, and thus the spring constant of both the coil springs is the same $ks_1/2$. In a free state in which the first coil spring 6 and the second coil spring 7 are subjected to no external force, the length to be protruded from the upper surface 15*a* of the socket housing 15 is equal to $x_2$ as shown in FIG. 1, and the separation between the lower end of the "+" side plug pin 21 and the contact part 11*b* of the "+" side socket contact 11 is equal to $x_1$.

Figure 2:
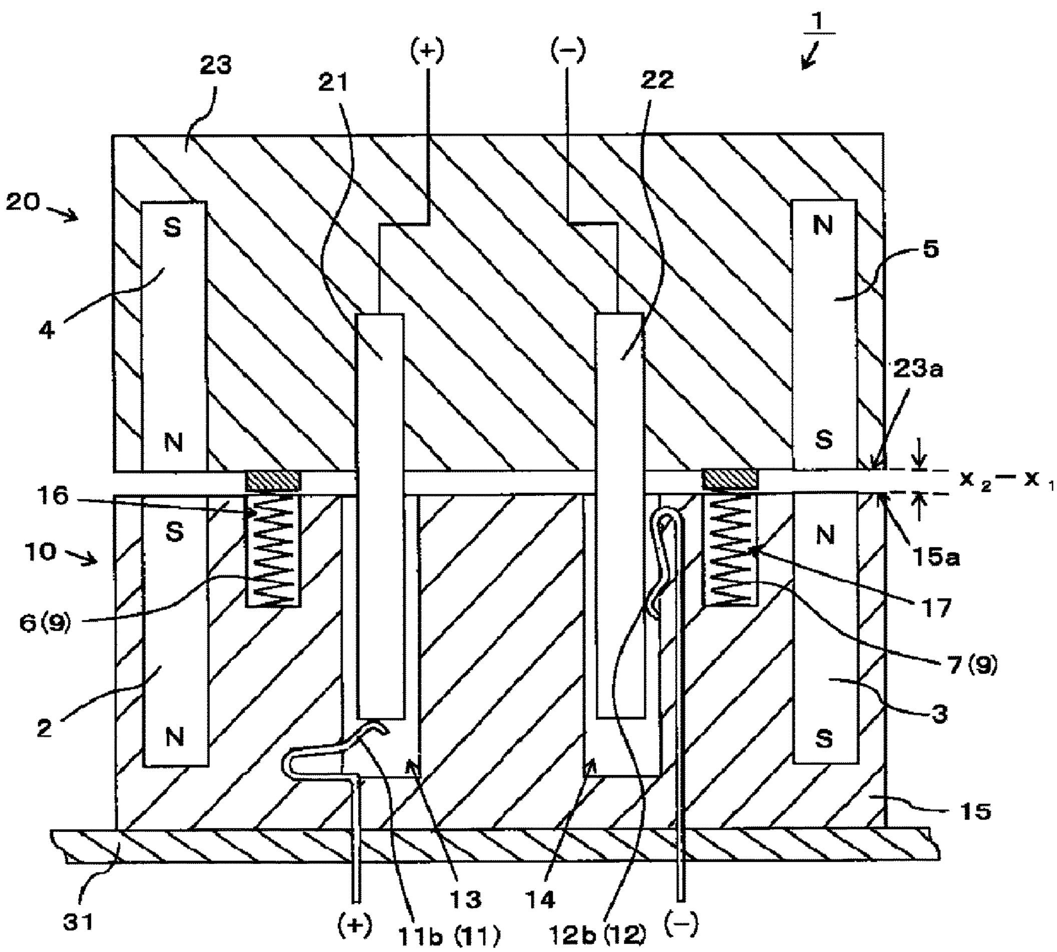
FIG. 2 is a longitudinal cross-sectional view illustrating an intermediate insertion position at which a "+" side plug pin 21 of the plug 20 is in contact with a "+" side socket contact 11 of the socket 10.

Thus, from an initial insertion position ($x=0$) of the "+" side plug pin 21 shown in FIG. 1 at which the lower surface 23*a* of the plug 20 is brought into contact with the upper ends of the first coil spring 6 and the second coil spring 7 to the intermediate insertion position ($x=x_1$) shown in FIG. 2, the plug 20 is subjected to a resilient force Fs ($Fs=ks_1 \cdot x$) directed upwardly in the direction of extraction by the first coil spring 6 and the second coil spring 7 being compressed. At the intermediate insertion position ($x=x_1$) where the "+" side plug pin 21 comes into proximity to or separates from the "+" side socket contact 11, the resilient force Fs in the direction of extraction is $ks_1 \cdot x_1$. Furthermore, letting the spring constant of the contact part 11*b* of the "+" side socket contact 11 be $ks_2$, between the intermediate insertion position ($x=x_1$) where the "+" side plug pin 21 is further inserted and the complete insertion position ($x=x_2$), further added is a resilient force $ks_2 \cdot x$ which is produced by the contact part 11*b* of the "+" side socket contact 11 being deflected in a downward direction. (Hereafter, the first coil spring 6, the second coil spring 7, and the contact part 11*b* of the "+" side socket contact 11, which are elastically deformed to thereby bias the plug 20 in the direction of extraction, will be collectively called a spring mechanism 9.) Thus, the plug 20 is subjected to the resilient force Fs ($Fs=(ks_1+ks_2) \cdot x$) directed upwardly in the direction of extraction, and at the complete insertion position ($x=x_2$) of the "+" side plug pin 21, the resilient force Fs in the direction of extraction is $ks_1 \cdot x_2+ks_2 \cdot (x_2-x_1)$.

On the other hand, the plug 20 connected to the socket 10 includes an insulating plug housing 23, a pair of the "+" side plug pin 21 and a "−" side plug pin 22 attached to the plug housing 23, and a pair of a plug-side first permanent magnet 4 and a plug-side second permanent magnet 5 of which lower ends are exposed on the lower surface 23*a* of the plug housing 23 and which are embedded vertically in the plug housing 23.

The pair of the "+" side plug pin 21 and the "−" side plug pin 22 attached to the plug housing 23 are integrally secured to the plug housing 23 so as to be protruded downwardly from the lower surface 23*a* of the plug housing 23 toward the pair of the "+" side plug insertion hole 13 and the "−" side plug insertion hole 14 on the side of the socket 10, respectively. Each upper end of the plug pins is connected to the terminal of a power supply cable (not shown) in the plug housing 23, thereby allowing the "+" side plug pin 21 to be connected to the high-voltage side power supply terminal of an electrical device that operates on a DC power supply via a power supply cable and the "−" side plug pin 22 to be connected to the low-voltage side power supply terminal.

The pair of the "+" side plug pin 21 and the "−" side plug pin 22 have the same protrusion length protruded from the lower surface 23*a* of the plug housing 23. As described above, the protrusion length is such that the separation between the lower surface 23*a* of the plug housing 23 and the upper surface 15*a* of the socket housing 15 is equal to the contact stroke ($x_2-x_1$) at the intermediate insertion position at which the "+" side plug pin 21 is brought into contact with the "+" side socket contact 11. With this arrangement, in the process of inserting the pair of the plug pins 21 and 22 into the pair of the plug insertion holes 13 and 14, after the "−" side plug pin 22 is brought into sliding contact with the contact part 12*b* of the "−" side socket contact 12, the "+" side plug pin 21 is brought into elastic contact with the "+" side socket contact 11 in the length of the contact stroke ($x_2-x_1$) from the intermediate insertion position to the complete insertion position at which the lower surface 23*a* of the plug 20 is brought into contact with the upper surface 15*a* of the socket 10. Then, at the complete insertion position ($x=x_2$), the "+" side plug pin 21 makes a hot-line connection to the "+" side socket contact 11.

The pair of the plug-side first permanent magnet 4 and the plug-side second permanent magnet 5 is embedded at the right and left symmetric positions with respect to the pair of the plug pins 21 and 22 sandwiched therebetween while the respective lower end portions are exposed on the lower surface 23*a* of the plug housing 23. Thus, inserting the pair of the plug pins 21 and 22 into the pair of the corresponding plug insertion holes 13 and 14 allows the lower end portions of the pair of permanent magnets 4 and 5 exposed on the lower surface 23*a* of the plug housing 23 to be opposed to the opposing upper end portions of the pair of the permanent magnets 2 and 3 exposed on the upper surface 15*a* of the socket housing 15, respectively.

Figure 3:
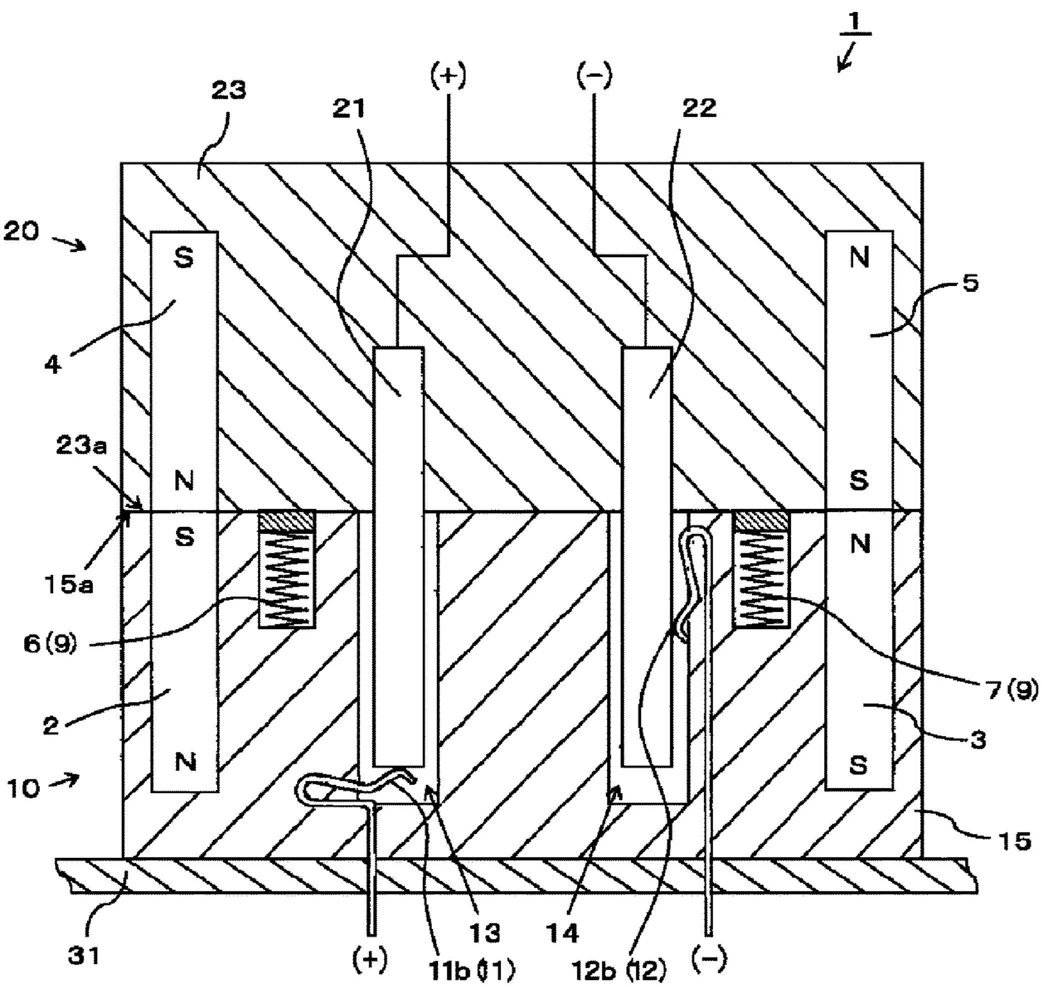
FIG. 3 is a longitudinal cross-sectional view illustrating a complete insertion position at which the "+" side plug pin 21 of the plug 20 has been inserted into the "+" side socket contact 11 of the socket 10 for a hot-line connection.

In this arrangement, the lower end portion of the plug-side first permanent magnet 4 embedded on the left of the "+" side plug pin 21 serves as the N pole, whereas the lower end portion of the plug-side second permanent magnet 5 embedded on the right of the "−" side plug pin 22 serves as the S pole. FIGS. 1 to 3 show the normal connection attitude of the plug 20, in the case of which the "+" side plug pin 21 is inserted into the "+" side plug insertion hole 13 so as to face the "+" side socket contact 11, and the "−" side plug pin 22 is inserted into the "−" side plug insertion hole 14 so as to face the "−" side socket contact 12. In this attitude, the socket-side first permanent magnet 2 and the plug-side first permanent magnet 4, which are opposed to each other, and the socket-side second permanent magnet 3 and the plug-side second permanent magnet 5, which are opposed to each other, have different magnetic poles, causing an attractive force to act in the direction of insertion in which the pair of the plug pins 21 and 22 are inserted into the pair of the corresponding plug insertion holes 13 and 14.

According to Coulomb's law, the attractive force Fm acting downwardly on the plug 20 due to the pair of the socket-side first permanent magnet 2 and the plug-side first permanent magnet 4 and the pair of the socket-side second permanent magnet 3 and the plug-side second permanent magnet 5 (hereafter to be referred to as magnetic field producing portion 8), which are opposed to each other in the direction of insertion and extraction of the plug pins 21 and 22 is inversely proportional to the square of the distance $(x_2-x)$ therebetween and expressed by $Fm=km/(x_2-x)^2$, where km is a proportionality constant. At the complete insertion position $(x=x_2)$ where the lower surface 23*a* of the plug 20 is brought into contact with the upper surface 15*a* of the socket 10 so as to allow the magnets to be completely attracted to each other, the attractive force Fm does not become infinite because the magnetic flux density between the magnets of the magnetic field producing portion 8 is limited, but takes on a certain upper limit Fm (max) as shown in FIG. 4 (in FIG. 4, the attractive force by the magnetic field producing portion 8 is expressed by −Fm in order to compare with the resilient force Fs acting upwardly on the plug 20 by the spring mechanism 9 in the direction of extraction).

Figure 4:
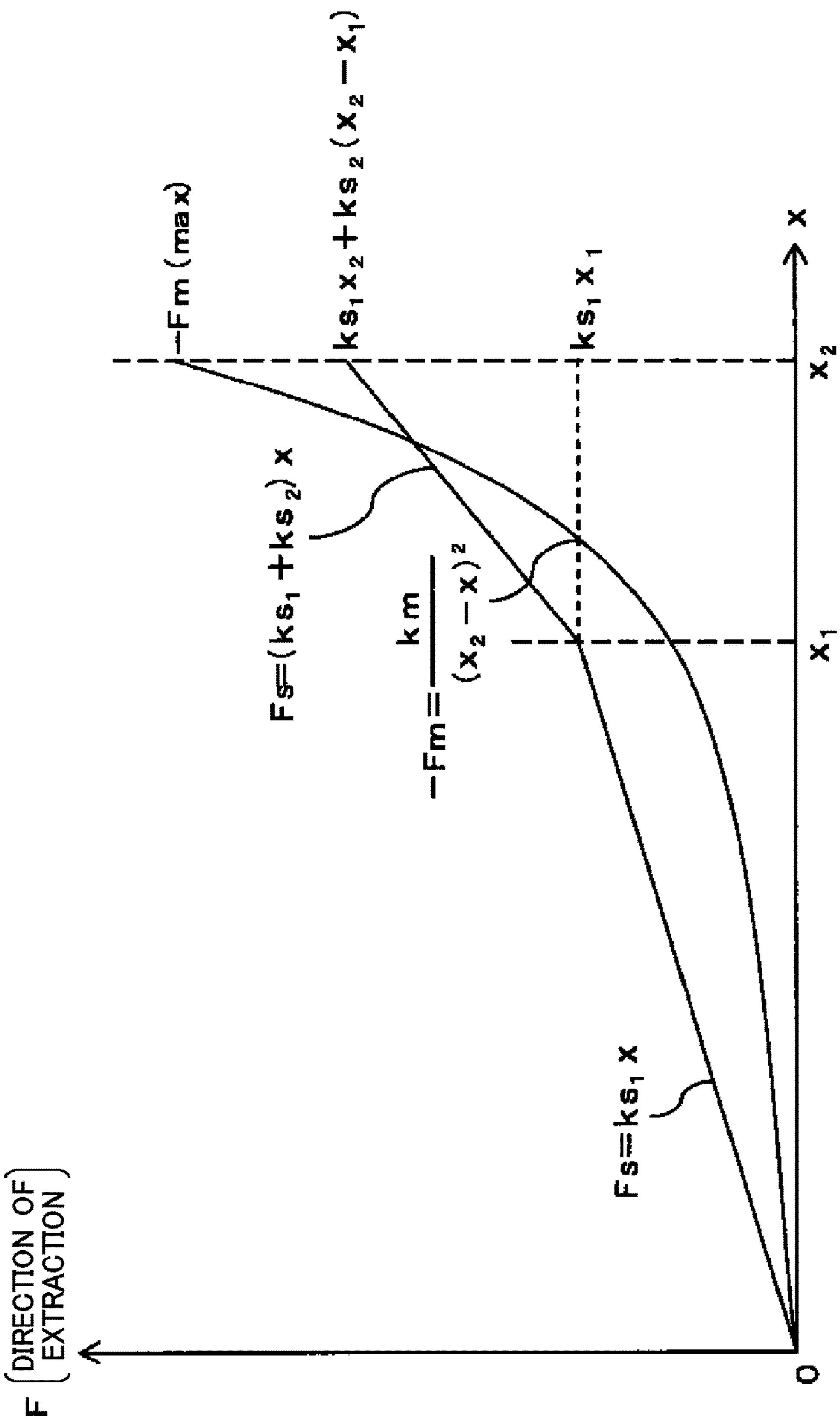
FIG. 4 is a graph indicative of the relation between the insertion position x of the "+" side plug pin 21 and the force F applied to the plug 20 in the direction of extraction.

Here, as shown in FIG. 4, the resilient force Fs by the spring mechanism 9 linearly increases according to the insertion distance x of the "+" side plug pin 21, whereas the attractive force Fm by the magnetic field producing portion 8 shows an increase in the absolute value in an inverse proportion to the square of $(x_2-x)$, and the proportionality constants $ks_1$ and $ks_2$ of the spring mechanism 9 and the proportionality constant km of the magnetic field producing portion 8 can be each adjusted to an arbitrary value, e.g., by the shape and the elastic material of the coil springs 6 and 7, and the contact part 11*b*, the magnitude for magnetizing the magnets, or the number of magnets. Thus, as shown in FIG. 4, between the intermediate insertion position $(x=x_1)$ and the complete insertion position $(x=x_2)$ of the "+" side plug pin 21, the magnitudes of the attractive force Fm in the direction of insertion and the resilient force Fs in the direction of extraction can coincide with each other.

That is, until the intermediate insertion position $(x=x_1)$ where the "+" side plug pin 21 comes into proximity to or separates from the "+" side socket contact 11 is reached, the resilient force Fs in the direction of extraction is greater than the attractive force Fm in the direction of insertion. At the complete insertion position $(x=x_2)$ where the "+" side plug pin 21 makes a hot-line connection to the "+" side socket contact 11, the proportionality constants $ks_1$ and $ks_2$ of the spring mechanism 9 and the proportionality constant km of the magnetic field producing portion 8 are adjusted so that the attractive force Fm in the direction of insertion is greater than the resilient force Fs in the direction of extraction.

Note that in the case where the "+" side plug pin 21 is located in the vicinity of the intermediate insertion position $(x=x_1)$ at which there is a possibility of occurrence of an arc discharge, the proportionality constants $ks_1$ and $ks_2$, and km are preferably adjusted so that the resilient force Fs in the direction of extraction is greater than at least the value acquired by adding the static friction between the plug 20 and the socket 10 to the attractive force Fm. In this arrangement, even when the insertion or extraction force on the plug 20 is released while the "+" side plug pin 21 is located in the vicinity of the intermediate insertion position $(x=x_1)$, the "+" side plug pin 21 is not stopped by static friction at an insertion position at which there is a possibility of occurrence of an arc discharge but is ejected in the direction of extraction by the resilient force Fs of the spring mechanism 9.

Now, a description will be made to the operation during the insertion and extraction process for insertion and extraction of the plug pins 21 and 22 of the plug 20 in the normal connection attitude into and out of the plug insertion holes 13 and 14 of the socket 10. Inserting the "+" side plug pin 21 into the "+" side plug insertion hole 13 and the "−" side plug pin 22 into the "−" side plug insertion hole 14 in the normal connection attitude of the plug 20 causes the "−" side socket contact 12 with the contact part 12*b* located at the intermediate position of the "−" side plug insertion hole 14 to be brought into contact with the "−" side plug pin 22 and then the contact part 12*b* of the "−" side socket contact 12 to be brought into sliding contact therewith as the "−" side plug pin 22 is inserted.

FIG. 1 shows the initial insertion position (x=0) of the "+" side plug pin 21, at which the lower surface 23*a* of the plug housing 23 is in contact with the upper ends of the first coil spring 6 and the second coil spring 7. Further inserting the plug 20 in the downward direction (in the direction of insertion) from that position causes the resilient force Fs in the direction of extraction $(Fs=ks_1\cdot x)$ by the first coil spring 6 and the second coil spring 7 to gradually increase according to the insertion distance x, so that the resilient force Fs acting in the direction of extraction at the intermediate insertion position $(x=x_1)$ where the "+" side plug pin 21 comes into proximity to or separates from the "+" side socket contact 11 is $ks_1\cdot x_1$. As shown in FIG. 4, between the initial insertion position (x=0) and the intermediate insertion position $(x=x_1)$, the attractive force Fm by the magnetic field producing portion 8 acts in the opposite direction (in the direction of insertion). However, since the distance between $(x_2-x)$ the permanent magnets is long, the value of the force is much lower than the resilient force Fs, so that releasing the insertion or extraction force on the plug 20 causes the plug 20 to be biased in the upward direction by the resilient force Fs of the spring mechanism 9 and thus the "+" side plug pin 21 to be drawn from the position in close proximity to the "+" side socket contact 11.

Figure 5:
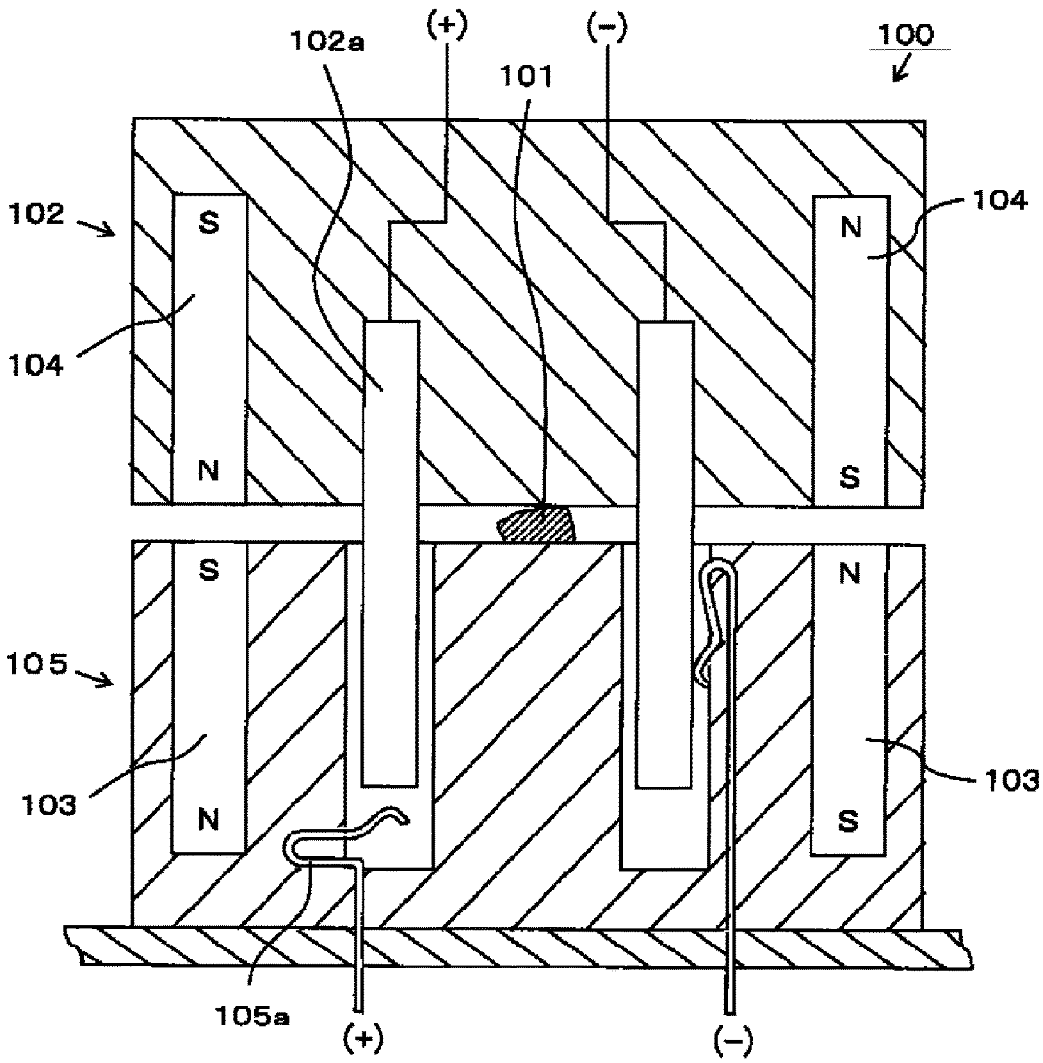
FIG. 5 is a longitudinal cross-sectional view illustrating a related DC distribution connection device 100 with a foreign matter 101 interposed between a plug 102 and a socket 105.

Thus, since the plug 20 is drawn in the upward direction by the resilient force Fs of the spring mechanism 9 even if there is interposed a foreign matter 101 as shown in FIG. 5 between the plug 20 and the socket 10, such a situation does not continue in which the "+" side plug pin 21 and the "+" side socket contact 11 are brought into close proximity to each other to cause the occurrence of an arc discharge.

Inserting the "+" side plug pin 21 into proximity to the intermediate insertion position $(x=x_1)$ causes the "+" side plug pin 21 and the contact part 11*b* of the "+" side socket contact 11 to be brought into close proximity to each other. Here, there will occur an arc discharge between the "+" side plug pin 21 and the contact part 11*b* of the "+" side socket contact 11, which are being brought into close proximity to each other, when the electric energy E $(E=\int V\cdot Idt)$ accumulated therebetween exceeds a certain boundary value, where V is the potential difference therebetween, and I is the current flowing therethrough across the insulation separation therebetween. When the boundary value exceeds, for example, a potential difference V of 25 V and a current I of 2 A, an arc discharge is thought to occur.

In this embodiment, a DC power supply that outputs 96 W DC power at 48 V and 2 A is connected between the "+" side socket contact 11 and the "−" side socket contact 12, and the "+" side plug pin 21 may be in the vicinity of the intermediate insertion position. In this case, the "−" side plug pin 22 is connected to the "−" side socket contact 12, so that the potential of the "+" side plug pin 21 is generally equal to the low-voltage side potential of the "−" side socket contact 12. Thus, when the insulation separation between the "+" side plug pin 21 and the contact part 11*b* of the "+" side socket contact 11 becomes less than a certain distance therebetween, electric energy E accumulated therebetween exceeds the electric energy E that allows the occurrence of an arc discharge. This would lead to an actual occurrence of an arc discharge.

However, in the region where the "+" side plug pin 21 and the contact part 11*b* of the "+" side socket contact 11 are in close proximity to each other, there is occurring a magnetic field in a direction orthogonal to the vertical direction between the "+" side plug pin 21 and the contact part 11*b* (in the direction of occurrence of an arc discharge), the magnetic field being established by magnetic force lines directed from the N pole of the lower end portion of the socket-side first permanent magnet 2 to the S pole of the lower end portion of the socket-side second permanent magnet 3. Thus, since the direction of an arc is deflected in the orthogonal direction, damage to the "+" side plug pin 21 and the "+" side socket contact 11 due to an arc discharge can be reduced, or since the arc discharge path itself is elongated, the occurrence of an arc discharge can be reduced.

As described above, the occurrence of an arc discharge depends on the insulation separation between the "+" side plug pin 21 and the contact part 11*b* of the "+" side socket contact 11. Thus, the proportionality constants $ks_1$ and $ks_2$ of the spring mechanism 9 and the proportionality constant km of the magnetic field producing portion 8 are adjusted so that from the insertion position at which there is a possibility of occurrence of an arc discharge to the intermediate insertion position at which the plug pin 21 is brought into contact with the contact part 11*b*, at least the resilient force Fs of the spring mechanism 9 is greater than the attractive force Fm of the magnetic field producing portion 8, or preferably, the resilient force Fs of the spring mechanism 9 is greater than the force in the direction of insertion acquired by adding static frictional force to the attractive force Fm of the magnetic field producing portion 8.

As shown in FIG. 3, further inserting the "+" side plug pin 21 downwardly in the contact stroke $x_2-x_1$ from the intermediate insertion position ($x=x_1$) thereof while deflecting the contact part 11*b* of the "+" side socket contact 11 in the downward direction causes the lower surface 23*a* of the plug 20 and the upper surface 15*a* of the socket 10 to be brought into contact with each other and the "+" side plug pin 21 to reach the complete insertion position ($x=x_2$). At the complete insertion position ($x=x_2$), since the "−" side plug pin 22 and the "−" side socket contact 12 are connected to each other, the "+" side plug pin 21 and the contact part 11*b* of the "+" side socket contact 11 are brought into elastic contact with each other at a predetermined contact pressure and make a hot-line connection. As a result, the 96 W DC power at 48 V and 2 A is supplied from the DC power supply, to which the socket 10 is connected, to an electrical device that is connected to the plug 20.

As shown in FIG. 4, while the "+" side plug pin 21 is located at the intermediate insertion position ($x=x_1$) and the complete insertion position ($x=x_2$), the resilient force by the contact part 11*b* being deflected is further added, and the gradient by which the resilient force Fs of the spring mechanism 9 increases according to the insertion distance x also increases. However, the attractive force Fm of the magnetic field producing portion 8 acting in the direction of insertion, which is inversely proportional to the square of the distance between the permanent magnets ($x_2-x$), further increases, and the attractive force Fm exceeds the resilient force between the two positions. At the complete insertion position ($x=x_2$), the attractive force Fm (max) of the magnetic field producing portion 8 is greater than the resilient force Fs of the spring mechanism 9 ($Fs=ks_1x_2+ks_2(x_2-x_1)$), and the plug 20 is subjected to force in the downward direction (in the direction of insertion) so as to hold the connection state in which the plug 20 and the socket 10 are in contact with each other. Thus, at the complete insertion position at which the "+" side plug pin 21 and the "+" side socket contact 11 make a hot-line connection to each other, it is not always necessary to provide a lock mechanism for holding the connection state, and a high lock strength is not required even when the lock mechanism is provided.

To pull the plug 20 out of the socket 10, the plug 20 is pulled upwardly from the complete insertion position ($x=x_2$) of the "+" side plug pin 21 shown in FIG. 3, thereby disconnecting between the "+" side plug pin 21 and the "+" side socket contact 11 and between the "−" side plug pin 22 and the "−" side socket contact 12 in the reverse order to the aforementioned insertion order. In the aforementioned process of pulling out the plug 20, the "+" side plug pin 21 comes into the region in which the contact part 11*b* of the "+" side socket contact 11 is in close proximity thereto, leading to the possibility of occurrence of an arc discharge. However, as in the insertion process, since there has occurred a magnetic field established by magnetic force lines directed in the orthogonal direction from the lower end portion of the socket-side first permanent magnet 2 to the lower end portion of the socket-side second permanent magnet 3, the direction of an arc is deflected. This allows damage to the "+" side plug pin 21 and the "+" side socket contact 11 due to an arc discharge to be reduced, or the occurrence of an arc discharge itself to be reduced.

Furthermore, beyond the intermediate insertion position ($x=x_1$) of the "+" side plug pin 21, the resilient force Fs of the spring mechanism 9 acts in the direction of extraction of the plug 20, and thus the plug 20 can be drawn with a slight effort. Furthermore, such a state does not continue in which an arc discharge readily occurs even when the extraction force on the plug 20 is released. This is because the resilient force Fs of the spring mechanism 9 causes the "+" side plug pin 21 to be drawn from the position at which the plug pin 21 is in close proximity to the contact part 11*b* of the "+" side socket contact 11.

Note that the plug 20 may be connected to the socket 10 in an erroneous connection attitude in which the "+" side plug pin 21 is inserted into the "−" side plug insertion hole 14 to face the "−" side socket contact 12, and the "−" side plug pin 22 is inserted into the "+" side plug insertion hole 13 to face the "+" side socket contact 11. In this case, the socket-side first permanent magnet 2 and the plug-side second permanent magnet 5, which are opposed to each other, have the same magnetic pole, and the socket-side second permanent magnet 3 and the plug-side first permanent magnet 4, which are opposed to each other, have the same magnetic pole, too. Therefore, a repulsive force acts in the direction of extraction in which the pair of the plug pins 21 and 22 is ejected out of the plug insertion holes 13 and 14. As a result, the pair of the plug pins 21 and 22 is not accidentally brought into contact with the socket contacts 11 and 12 having different polarities.

In the aforementioned embodiment, although the plug 20 was provided with the permanent magnets 4 and 5, the plug 20 may also be provided with a magnetic substance such as an iron plate that is magnetized by the permanent magnets 2 and 3 so long as the permanent magnets 2 and 3 attached to the socket 10 can attract the plug 20 in the direction of insertion.

Furthermore, although the aforementioned spring mechanism 9 has the coil springs 6 and 7 attached to the socket 10, the springs may also be one that is attached to the plug 20 and not limited to the coil spring in terms of the shape and material so long as the springs bias the plug 20 in the direction of extraction in response to the insertion of the plug 20.

Furthermore, although the pair of the coil springs 6 and 7 constitutes the spring mechanism 9, one or more springs may constitute the spring mechanism. Likewise, it is also possible to use any number of permanent magnets or magnetic substances to be attached to the plug or the socket as the magnetic field producing portion 8.

Furthermore, the upper portions of the socket-side first permanent magnet 2 and the socket-side second permanent magnet 3 attached to the socket 10 and the lower portions of the plug-side first permanent magnet 4 and the plug-side second permanent magnet 5 attached to the plug 20 are exposed on the upper surface 15*a* of the socket housing 15 and the lower surface 23*a* of the plug housing 23, which are opposed to each other, respectively. However, at least part of the surfaces may be shielded with a cover or film so long as the attractive force Fm by the magnetic field producing portion 8 is less than the resilient force Fs of the spring mechanism 9 at the intermediate insertion position ($x=x_1$), and is greater than the resilient force Fs of the spring mechanism 9 at the complete insertion position ($x=x_2$).

Furthermore, the description was made to the arrangement in which the "+" side plug pin 21 is brought from above into elastic contact with the contact part 11*b* of the "+" side socket contact 11. However, like the contact part 12*b* of the "−" side socket contact 12, the contact part 11*b* may also be shaped to be protruded into the "+" side plug insertion hole 13 from the side of the "+" side plug insertion hole 13 so as to be brought into sliding contact with the "+" side plug pin 21. As described above, when the contact part 11*b* of the "+" side socket contact 11 is configured to be in sliding contact therewith, the "+" side plug pin 21 is not subjected to the resilient force in the direction of extraction from the "+" side socket contact 11 between the intermediate insertion position ($x=x_1$) and the complete insertion position ($x=x_2$). Thus, it is possible to employ magnetic field producing portion 8 for providing a lower attractive force Fm as compared with this embodiment.

The embodiments of the invention is applicable to a DC distribution connection device for making a hot-line connection between a plug pin and a socket contact which have a possibility of occurrence of an arc discharge.

REFERENCE SIGNS LIST

- 1 DC distribution connection device
- 2 socket-side first permanent magnet (magnetic field producing portion)
- 3 socket-side second permanent magnet (magnetic field producing portion)
- 4 plug-side first permanent magnet (magnetic field producing portion)
- 5 plug-side second permanent magnet (magnetic field producing portion)
- 6 first coil spring (spring mechanism)
- 7 second coil spring (spring mechanism)
- 8 magnetic field producing portion
- 9 spring mechanism
- 10 socket
- 11 "+" side socket contact (plate spring contact)
- 11*b* contact part
- 15*a* upper surface
- 20 plug
- 21 "+" side plug pin
- 23*a* lower surface

The invention claimed is:

1. A DC distribution connection device comprising:
a plug having plug pins to be connected to a DC load;
a socket having socket contacts which are configured for connection to a DC power supply and located in plug insertion holes that guide the plug pins so as to be freely inserted therein and extracted therefrom, wherein the plug pins and the socket contacts are configured to be brought into contact with each other between an intermediate insertion position of the plug pins at which at least one but not all of the plug pins come into contact with a corresponding at least one but not all of the socket contacts, and a complete insertion position beyond the intermediate insertion position in a direction of insertion at which remaining ones of the plug pins make a hot-line connection to corresponding remaining ones of the socket contacts;
a magnetic field producing portion that is formed between the plug and the socket, the magnetic field producing portion attracting the plug and the socket by a magnetic force in the direction of insertion of the plug pins; and
a spring mechanism that is disposed between the plug and the socket, the spring mechanism being compressable between the plug and the socket so as to generate a resilient force that biases the plug in the direction of extraction of the plug pins, wherein
the resilient force of the spring mechanism is greater than the magnetic force by the magnetic field producing portion at the intermediate insertion position of the plug pins, and the magnetic force is greater than the resilient force at the complete insertion position of the plug pins.

2. The DC distribution connection device according to claim 1, wherein:
the magnetic field producing portion comprises a set of a permanent magnet and a magnetic substance, one and the other of which are disposed on respective confronting surfaces of the plug and the socket, the confronting surfaces opposed to each other in the direction of insertion and the direction of extraction of plug pins.

3. The DC distribution connection device according to claim 1, wherein:
the socket contacts are each a plate spring contact;
the at least one but not all socket contacts are deflected by the corresponding at least one but not all plug pins with the plug pins in the intermediate insertion position, and all of the socket contacts are deflected by the corresponding plug pins at the complete insertion position; and
at the complete insertion position, the magnetic force by the magnetic field producing portion is greater than a combined resilient force generated by the resilient force of the spring mechanism and a resilient force generated by deflection of the plate spring contacts in the direction of extraction.

4. The DC distribution connection device according to claim 1, wherein:
the magnetic field producing portion comprises a pair of socket-side permanent magnets disposed on both sides of the plug insertion holes of the socket, and a pair of plug-side magnetic substances disposed at respective opposing positions of the plug which are opposed to the pair of socket-side permanent magnets in the direction of insertion and the direction of extraction of the plug pins; and the pair of socket-side permanent magnets is polarized to polarities that form a magnetic field between the pair of permanent magnets in a region of the plug insertion holes where the socket contacts are each located.

5. The DC distribution connection device according to claim 4, wherein the pair of plug-side magnetic substances are plug-side permanent magnets which are polarized into magnetic poles different from the magnetic poles of the pair of socket-side permanent magnets opposing, respectively, in the direction of insertion and the direction of extraction of the plug pins, in a normal connection attitude of the plug in which the plug pins are inserted into the plug insertion holes toward the corresponding socket contacts.

* * * * *